Figure 1:
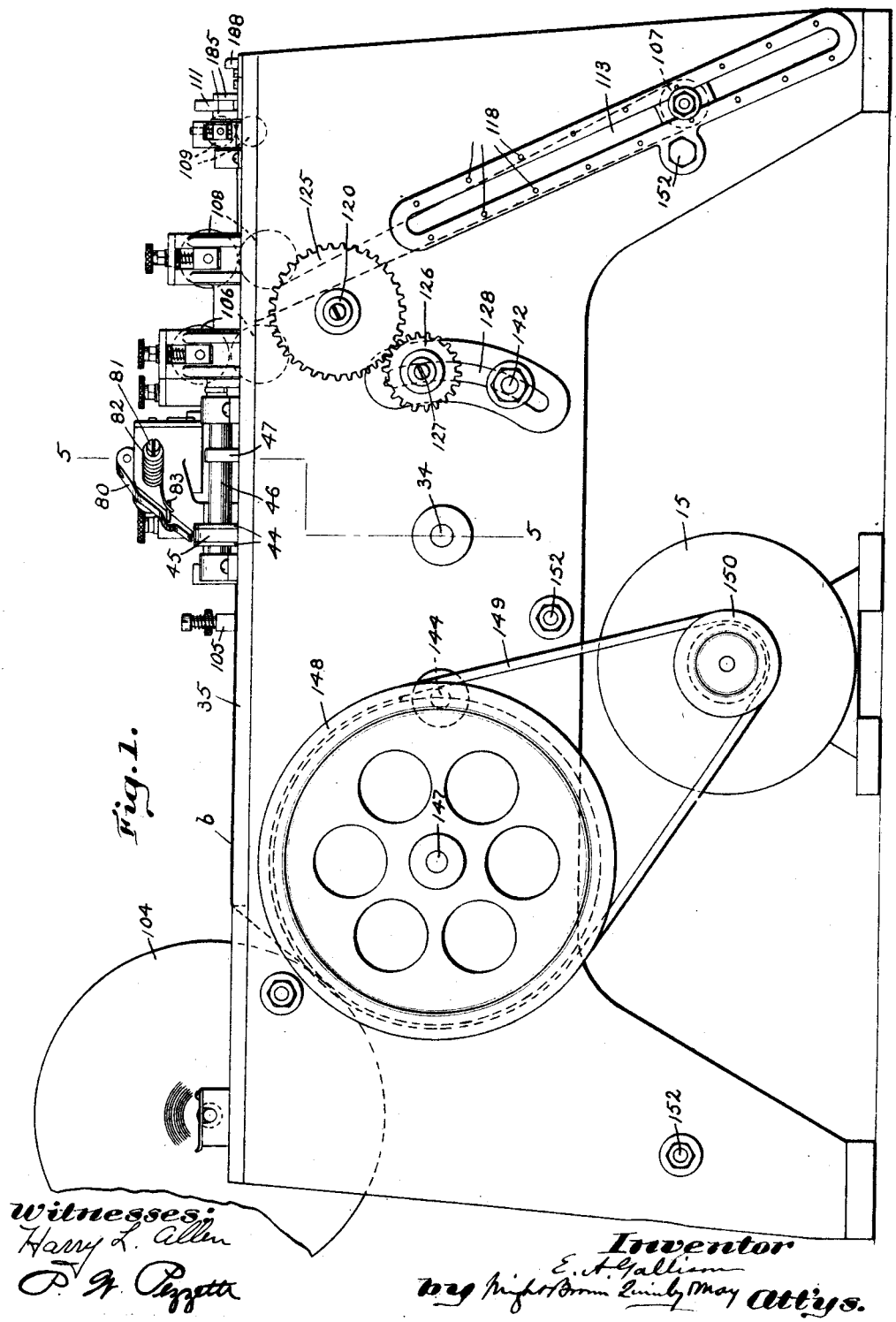

E. A. GALLISON.
MACHINE FOR TIPPING LACES.
APPLICATION FILED OCT. 6, 1911.

1,030,514.

Patented June 25, 1912.
13 SHEETS—SHEET 1.

Witnesses:
Harry L. Allen

Inventor
E. A. Gallison
by Wright Brown Quinby May Attys.

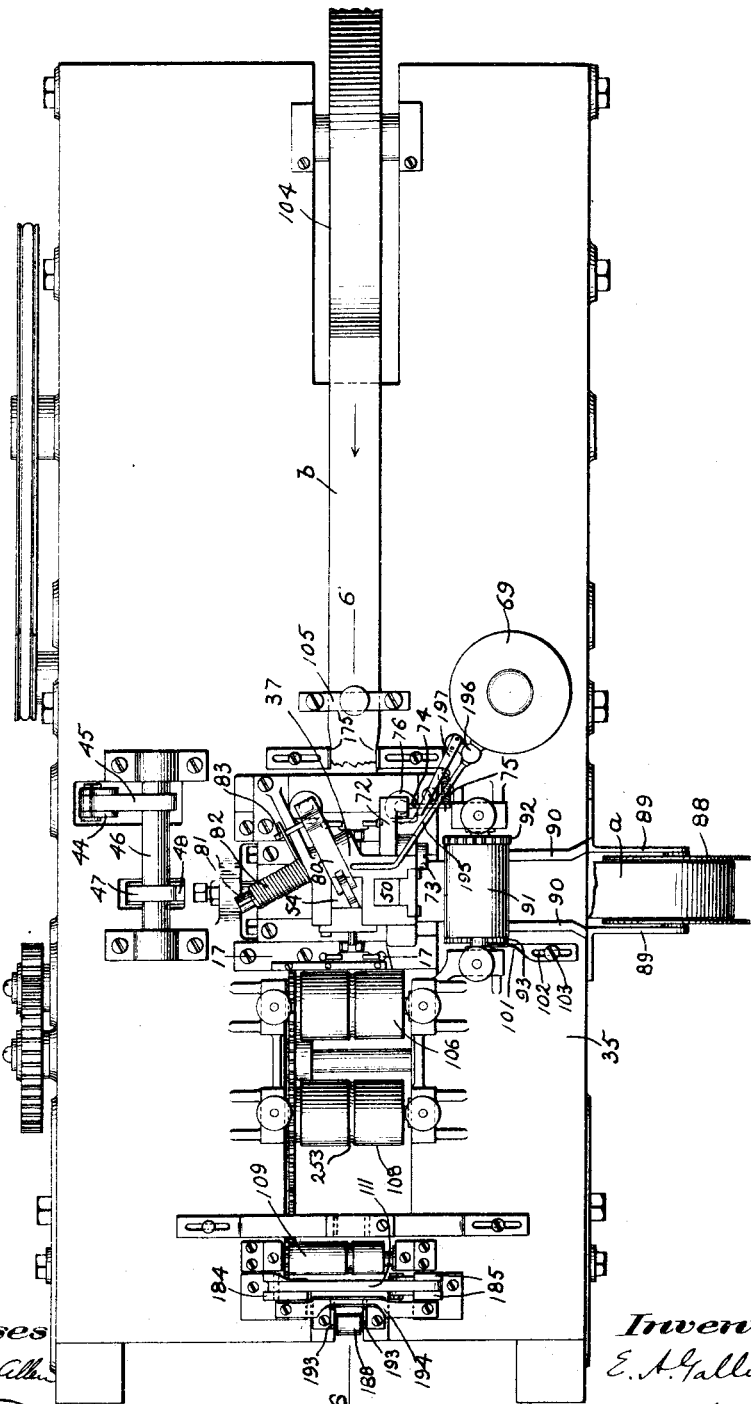

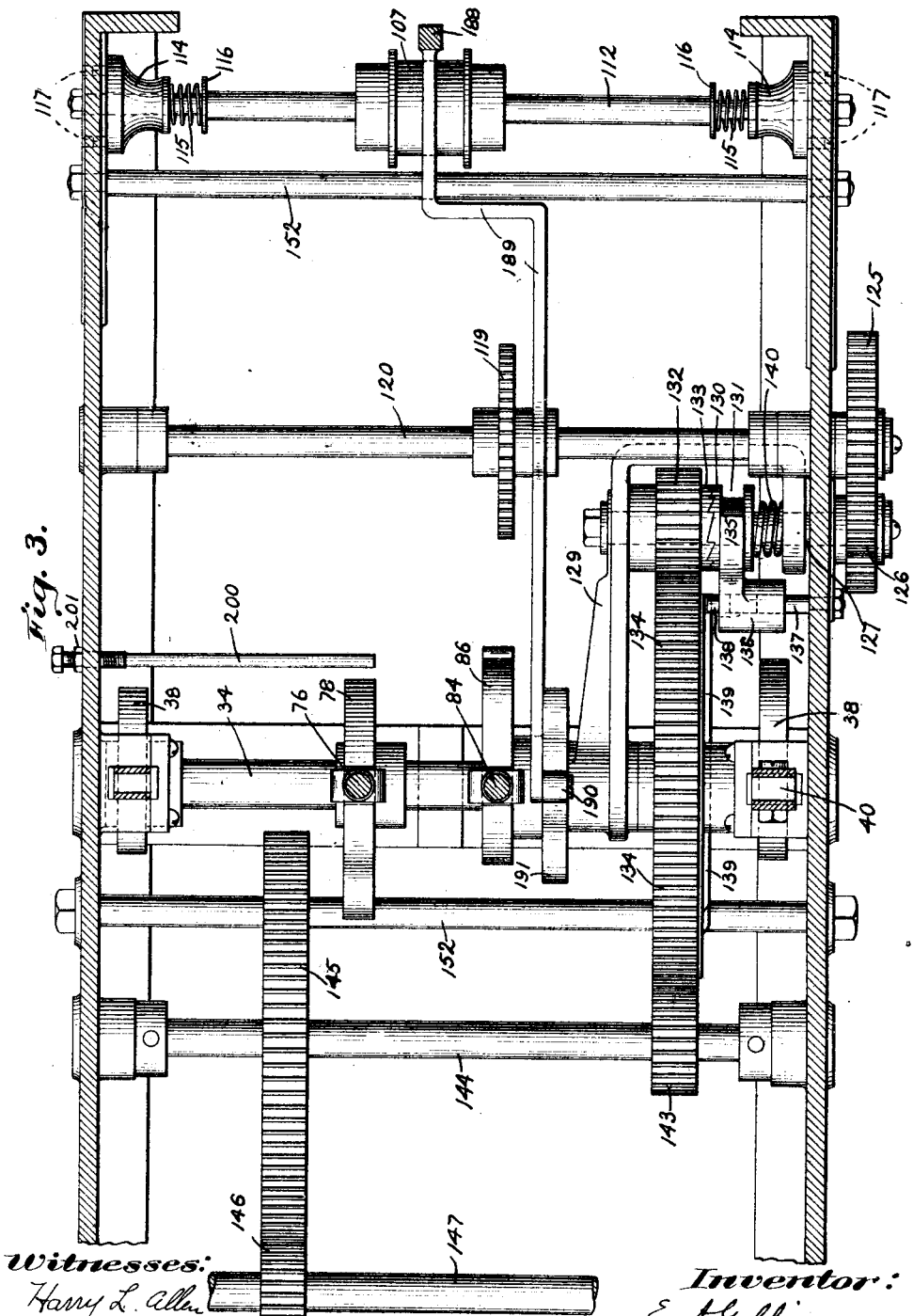

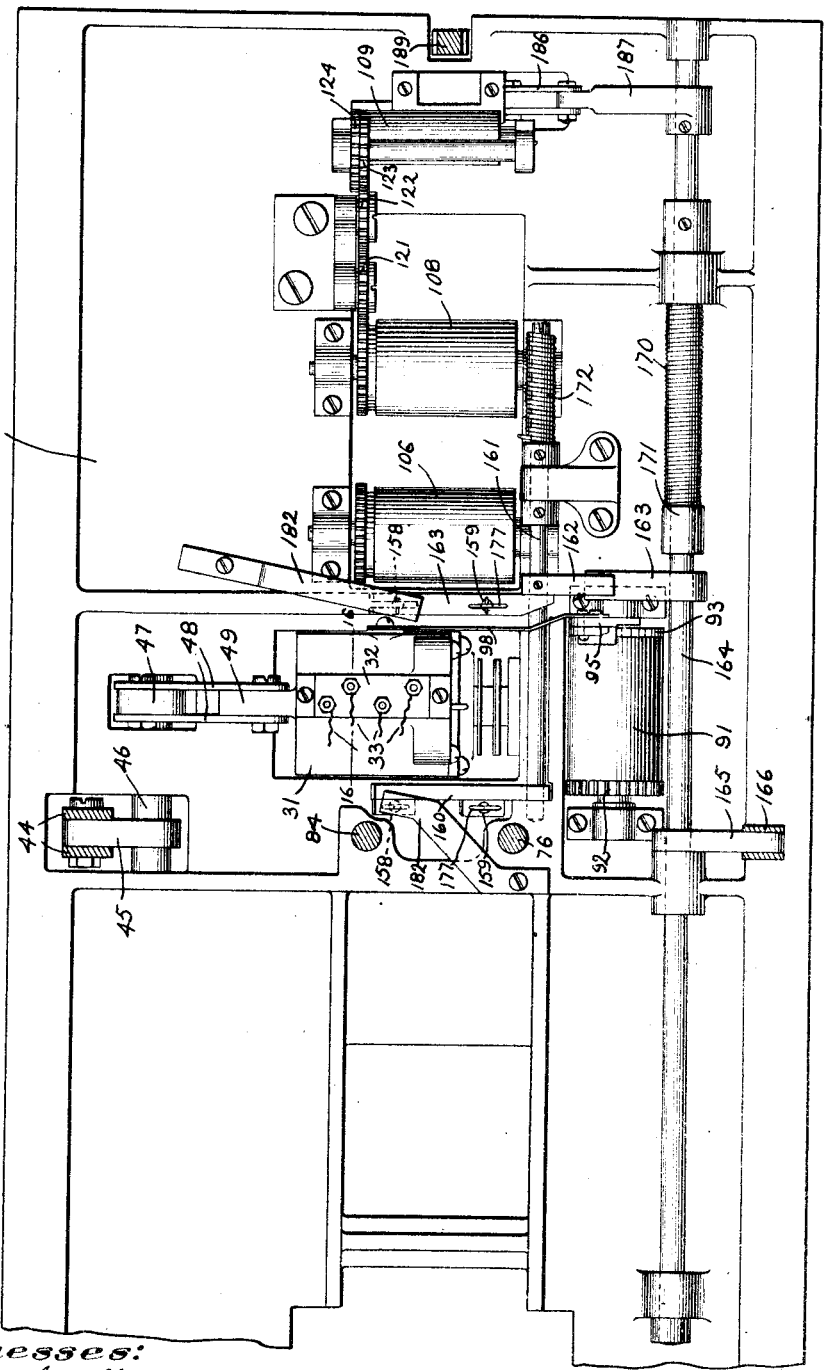

E. A. GALLISON.
MACHINE FOR TIPPING LACES.
APPLICATION FILED OCT. 6, 1911.
1,030,514.
Patented June 25, 1912.
13 SHEETS—SHEET 5.
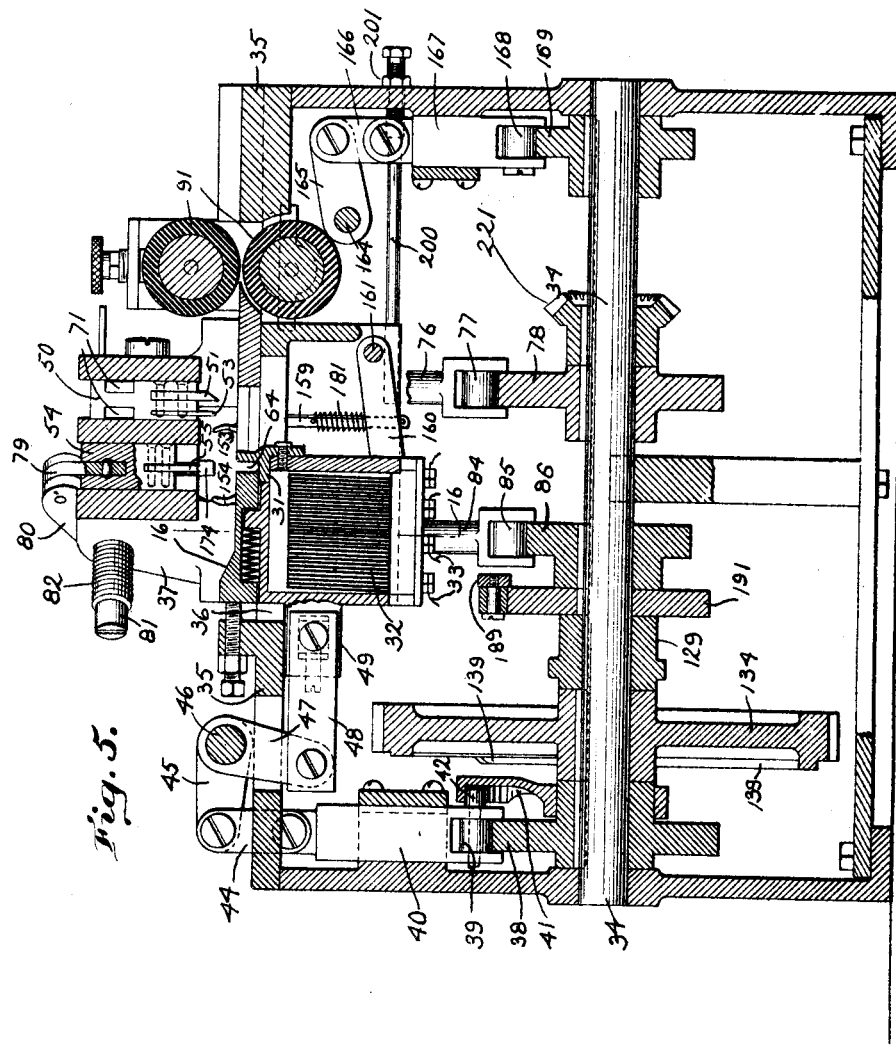

E. A. GALLISON.
MACHINE FOR TIPPING LACES.
APPLICATION FILED OCT. 6, 1911.
1,030,514.
Patented June 25, 1912.
13 SHEETS—SHEET 6.
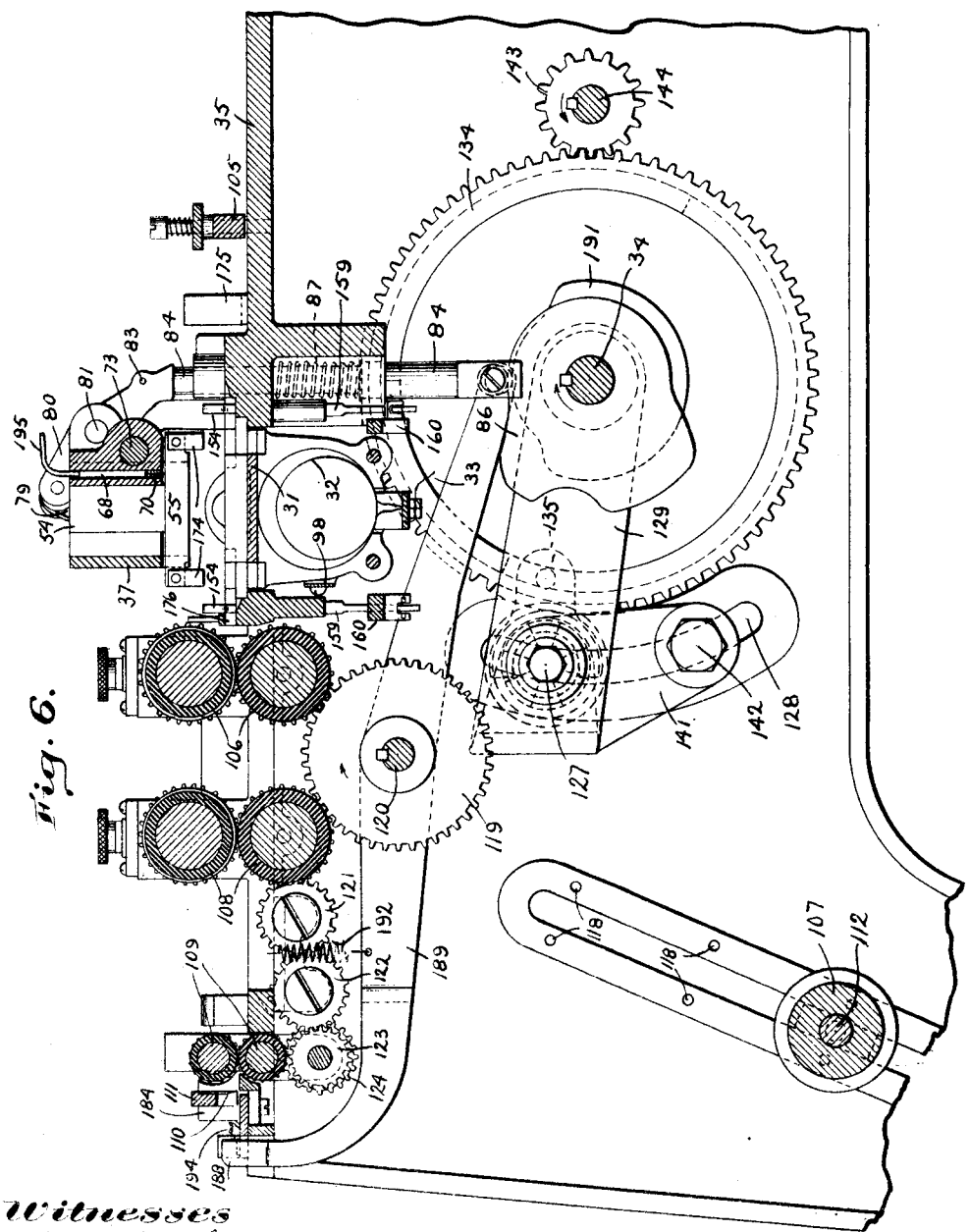

E. A. GALLISON.
MACHINE FOR TIPPING LACES.
APPLICATION FILED OCT. 6, 1911.
1,030,514.
Patented June 25, 1912.
13 SHEETS—SHEET 7.
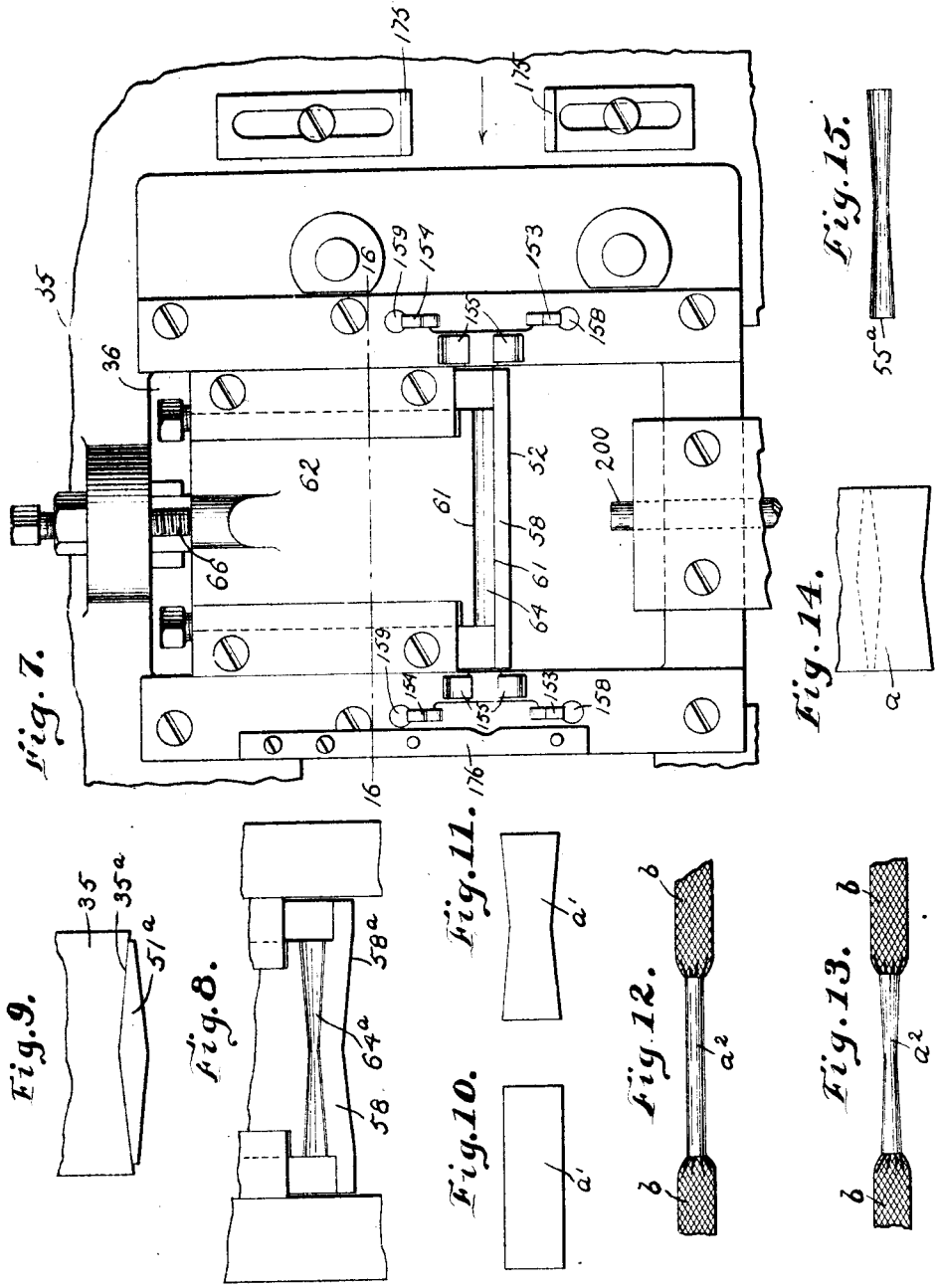

E. A. GALLISON.
MACHINE FOR TIPPING LACES.
APPLICATION FILED OCT. 6, 1911.
1,030,514. Patented June 25, 1912.
13 SHEETS—SHEET 8.
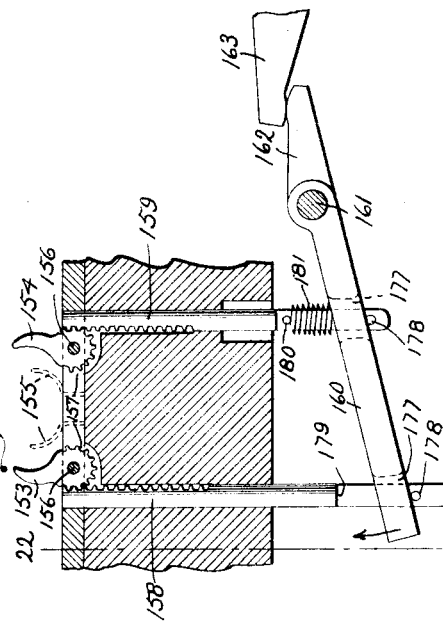
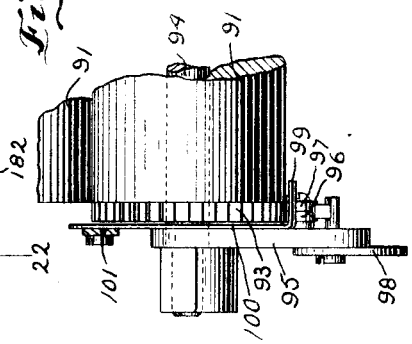
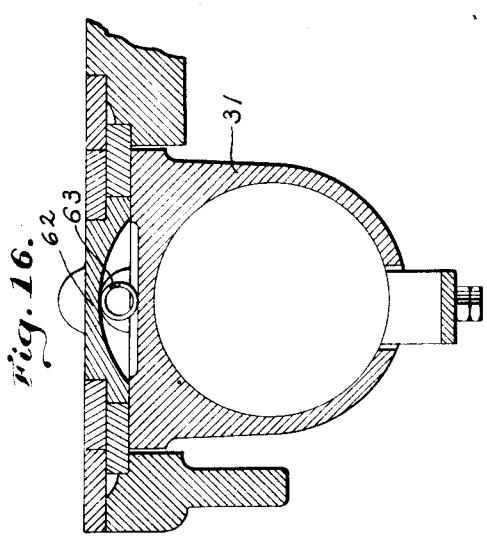
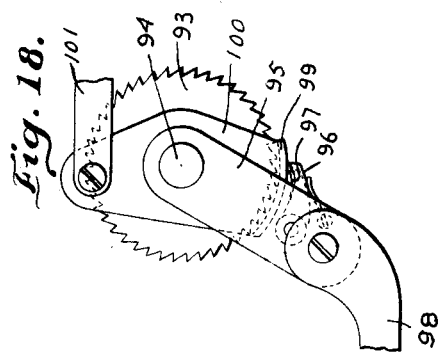
Witnesses
Harry L Allen
Inventor:
E A Gallison
by Wright Brown Quinby May
attys.

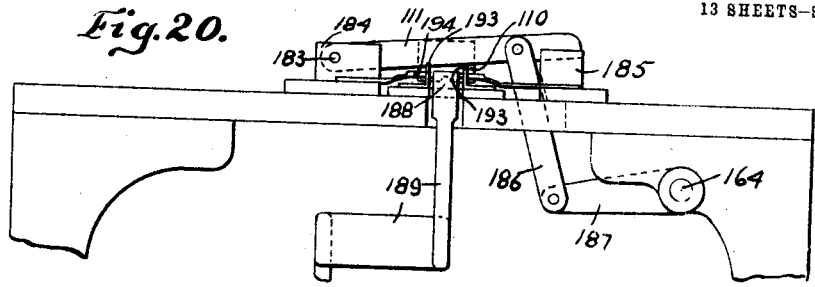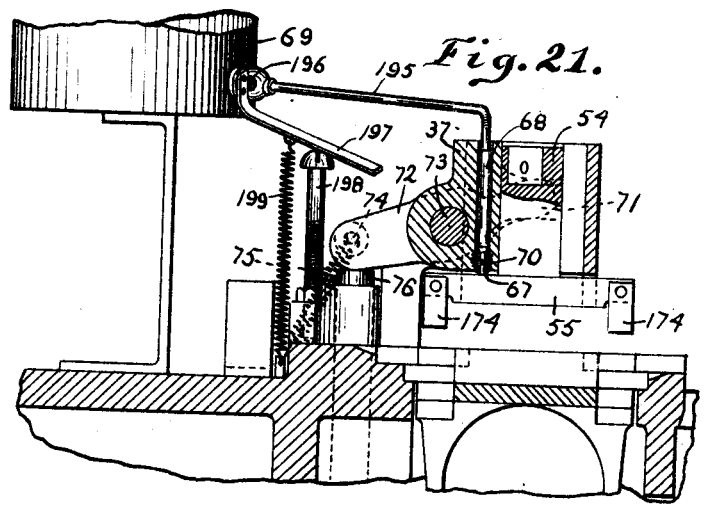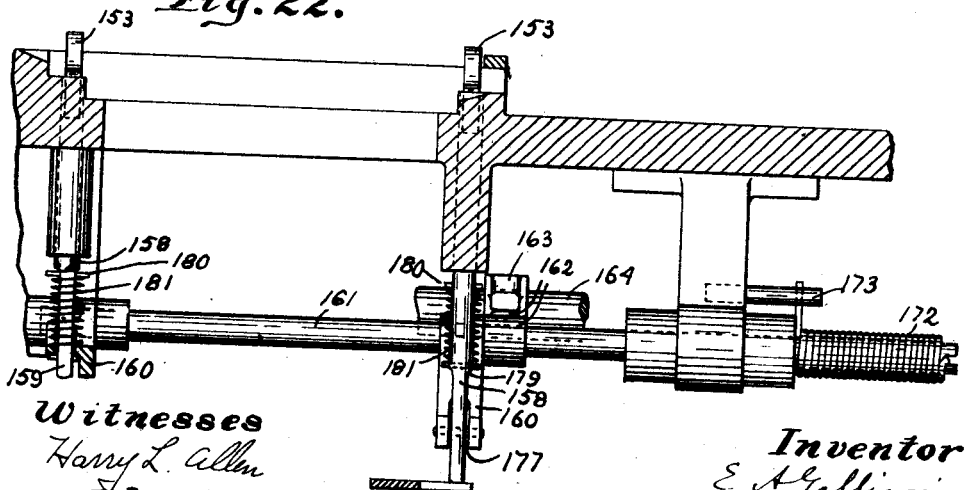

E. A. GALLISON.
MACHINE FOR TIPPING LACES.
APPLICATION FILED OCT. 6, 1911.
1,030,514.
Patented June 25, 1912.
13 SHEETS—SHEET 10.
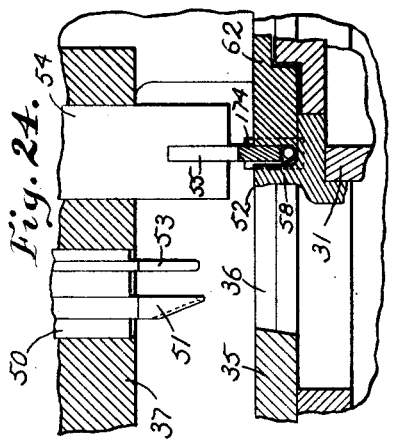
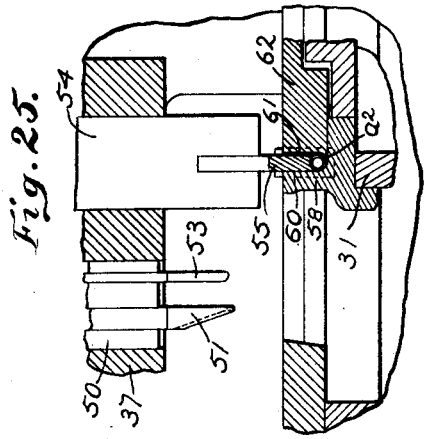
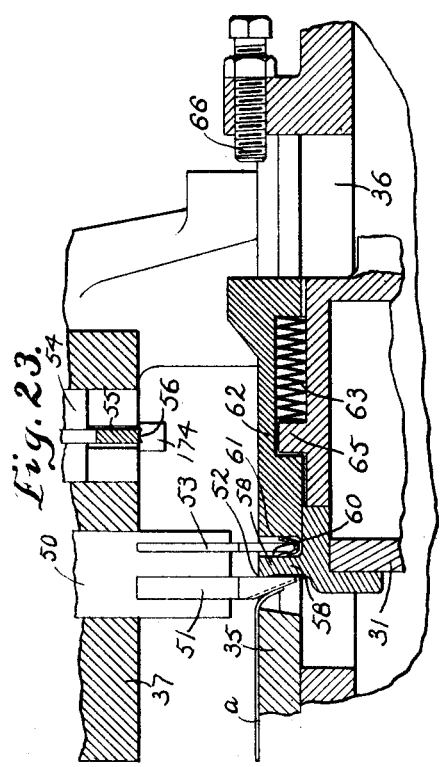
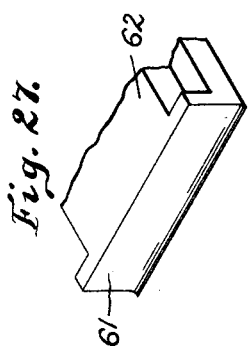
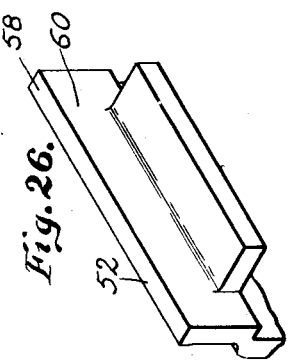
Witnesses
Harry L. Allen
P. W. Pezzetti
Inventor:
E. A. Gallison
by Wright, Brown, Quinby & May
Att'ys E. A. GALLISON.
MACHINE FOR TIPPING LACES.
APPLICATION FILED OCT. 6, 1911.
1,030,514.
Patented June 25, 1912.
13 SHEETS—SHEET 11.
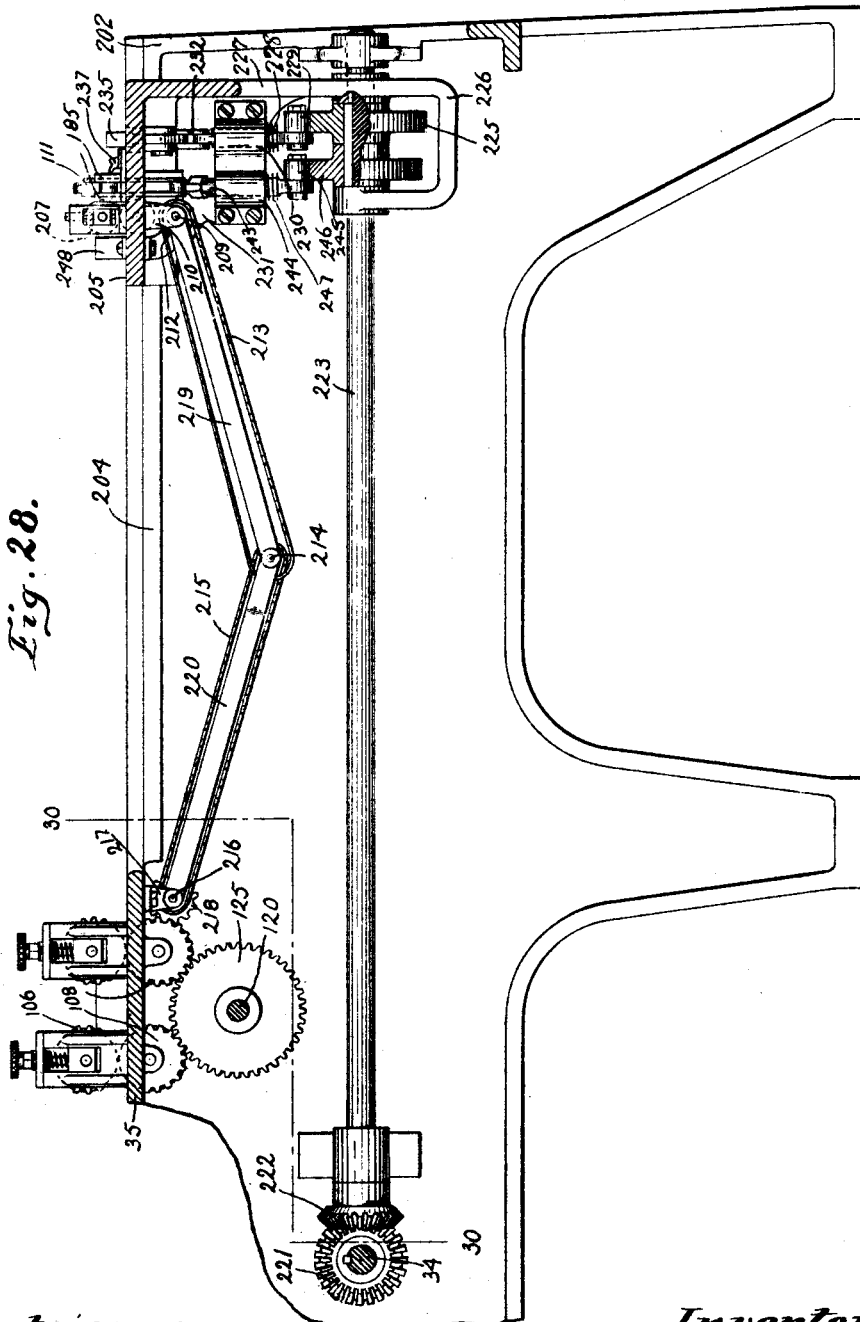

E. A. GALLISON.
MACHINE FOR TIPPING LACES.
APPLICATION FILED OCT. 6, 1911.
1,030,514.
Patented June 25, 1912.
13 SHEETS—SHEET 12.
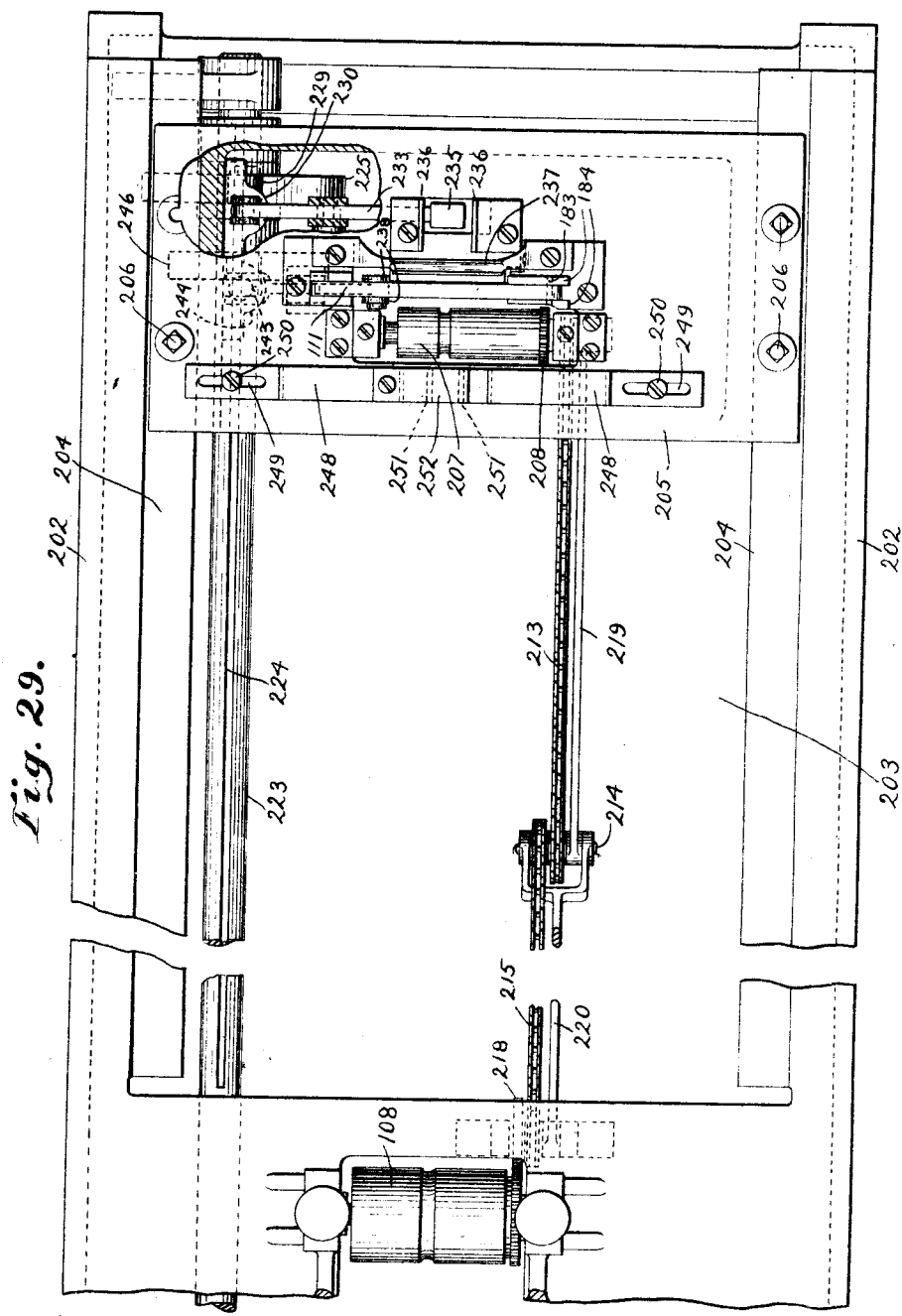

E. A. GALLISON.
MACHINE FOR TIPPING LACES.
APPLICATION FILED OCT. 6, 1911.
1,030,514.
Patented June 25, 1912.
13 SHEETS—SHEET 13.
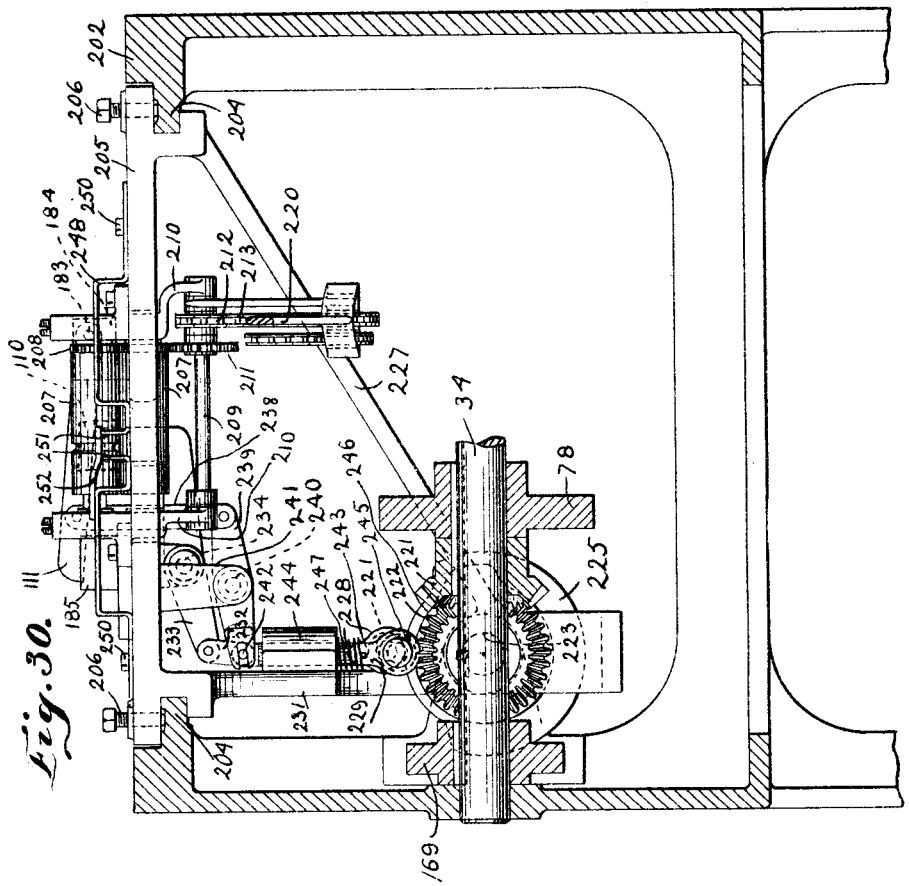

UNITED STATES PATENT OFFICE.

ERNEST A. GALLISON, OF EVERETT, MASSACHUSETTS, ASSIGNOR TO COLONIAL FAST COLOR TIPPING COMPANY, OF BOSTON, MASSACHUSETTS, A CORPORATION OF MAINE.

MACHINE FOR TIPPING LACES.

1,030,514.   Specification of Letters Patent.   Patented June 25, 1912.

Application filed October 6, 1911. Serial No. 653,204.

*To all whom it may concern:*

Be it known that I, ERNEST A. GALLISON, a citizen of the United States, and a resident of Everett, in the county of Middlesex and State of Massachusetts, have invented certain new and useful Improvements in Machines for Tipping Laces, of which the following is a specification.

Lacings for shoes, corsets, and other articles, as most commonly made, comprise strips of fabric termed braid, tape or ribbon which will hereinafter be referred to under the generic term ribbon, said strips of ribbon having their ends stiffened, usually with sheet metal, in order to facilitate the threading of the lacings through eyelets. As is well known, the sheet metal tips frequently slip off the ribbon in spite of the fact that the metal is perforated or punched to secure better engagement with the fabric of the ribbon. This treatment of the metal causes the tips to be externally rough, so that they are unsightly and cause more wear of the eyelet coatings than smooth tips, and are more liable to catch when lacing up. When they slip off, the lacing is practically rendered valueless. A particular disadvantage when sheet metal tips are employed for lacings that are used in connection with articles of apparel that are washed, is that the lacings must be removed before the garment is washed, or else the metal is likely to cause the fabric to become stained by rust spots.

I have invented a machine which makes lacings that avoid the objections specified, said lacings having tips of sheet plastic material of a nature that presents a hard, and externally smooth surface; that are ornamental in that they may be of any shade or color to match or contrast with the fabric of the ribbon; that will not rust; and which have their inner surfaces so intimately connected with said fabric that they cannot be pulled off.

The object of the present invention is to provide a machine that will rapidly and economically produce lacings having tips of the character described, the material of said tips being sheet celluloid or cellon or similar material in sheet form. To avoid frequent repetitions hereinafter, I shall use the term celluloid with the understanding that I do not limit myself thereby, but that the machine may be employed for making tips from any material that possesses the characteristics mentioned, and the further one of being capable of being temporarily softened by heat and a solvent so that the fibers of the ribbon may become somewhat embedded in the tip material when the latter is wrapped around the ribbon and pressed thereon, and so as to constitute a practically seamless sheath of sheet material.

The invention is embodied in a machine adapted to sever blanks from a strip of sheet celluloid or analogous material and fold or wrap said blanks around portions of a lacing fabric or ribbon in such manner as to convert each blank into a tube which closely embraces the ribbon and holds it compressed and is given a permanent form by the machine, means being provided for severing the tube and the portion of the fabric embraced by it midway between the ends of the tube, thus forming the ends of two tipped lacings.

The invention consists in the improvements which I will now proceed to describe and claim.

Of the accompanying drawings: Figure 1 is a side elevation, looking from the upper side of Fig. 2, of a machine embodying my invention; Fig. 2 is a plan view of the same; Fig. 3 is a sectional plan view, on a larger scale than Fig. 2, of parts beneath the table; Fig. 4 is an under plan view; Fig. 5 represents a section on line 5—5 of Fig. 1 on a larger scale; Fig. 6 represents a section on line 6—6 of Fig. 2, on a larger scale; Fig. 7 is a plan view of a portion of the machine including the carrier hereinafter described, and the fixed parts which support and guide the same, said figure showing a structure employed when straight or cylindrical tubes are to be formed; Fig. 8 is a view similar to a portion of Fig. 7, but showing a structure that is employed when the sheath tube is to have a double taper to produce, when cut, two frusto-conical tips; Fig. 9 is a plan view of the form of movable cutter employed in connection with the structure shown in Fig. 8; Figs. 10 and 11 illustrate the shapes of blanks cut from the celluloid strip for making, respectively, straight and tapered tips; Figs. 12 and 13 illustrate the forms of tubes applied to the ribbon to produce, respectively, straight and tapered tips; Fig. 14 represents the forward end portion of the strip from which tapered or frusto-conical tips are formed; Fig. 15 is a bottom end view of the secondary folding blade or punch employed in making tapered tips; Fig. 16 represents a section on line 16—16 of Figs. 5 and 7; Fig. 17 represents a section on line 17—17 of Fig. 2, on a larger scale; Fig. 18 is a detail end view of the mechanism for actuating the lower feed roll for the strip of celluloid; Fig. 19 is a view looking from the right of Fig. 18, and showing also a portion of the upper feed roll; Fig. 20 is a detail elevation of the tip stop and the cutting mechanism for severing the tube and the inclosed fabric; Fig. 21 is a detail section on the same line as Fig. 6, but looking in a direction opposite the view shown in Fig. 6, and showing the solvent reservoir and connections; Fig. 22 represents a section on line 22—22 of Fig. 17; Fig. 23 is a view similar to a portion of Fig. 5, but looking in the opposite direction; Figs. 24 and 25 are views similar to Fig. 23, illustrating further steps in the operation; Figs. 26 and 27 are perspective views of portions of the mechanism which fold the celluloid blanks; Fig. 28 is an elevation, partly in section, showing cutting mechanism differing from that shown in the preceding figures, and constituting really the preferred form of such mechanism; Fig. 29 is a plan view, partly broken out and in section, of the mechanism shown in Fig. 28; Fig. 30 represents a section on line 30—30 of Fig. 28.

Similar reference characters indicate the same or similar parts in all the figures.

I will first describe the mechanism for forming the blanks, which mechanism is located near the center of the machine shown in Fig. 2.

A carrier 31 is mounted to slide horizontally in an opening 36 formed in the bed or table 35 of the machine (see Figs. 2, 5, 6, 7 and 23), said carrier having means for heating the tip-forming devices hereinafter described. The lower part of said carrier is formed as a cylindrical box like structure adapted to contain a suitable heater such as an electric heater indicated conventionally at 32 in Fig. 5, the wires of the circuits for such heater being indicated at 33 (see also Fig. 4). The carrier 31 supports and moves certain elements of the tip forming mechanism hereinafter described, which mechanism severs a tip blank $a'$ from the strip $a$ of celluloid, wraps said blank in tubular form around the ribbon $b$, welds the longitudinal and lapped edges of the blank together to provide a permanent tube $a^2$ which, as indicated in Figs. 12 and 13, is of double the length of a lacing tip, it being understood that by mechanism hereinafter described, the tube and the lacing fabric or ribbon therein is severed to form the tipped ends of two laces.

The frame of the machine supports a shaft 34 (Fig. 5) having a cam 38 that actuates the carrier 31 in one direction by means of a trundle roll 39 carried by a vertical slide 40, the upper end of which is connected by a link 44 with an arm 45 of a rock shaft 46, said rock shaft having another arm 47 connected by a link 48 to an ear 49 of the carrier 31. The link 48 is preferably adjustably connected with said ear, as indicated by dotted lines in Fig. 5, to enable the proper position of the carrier to be readily secured. The return motion of the vertical slide 40, and consequently of the carrier 31 also, may be effected by an internal cam 41 on shaft 34 engaging a roll 42 projecting laterally from slide 40.

The tip-forming mechanism includes elements supported above the carrier 31 by a frame standard 37, rising above the table 35. Mounted in said standard is a vertical slide 50 carrying a shear blade or knife 51 which coöperates with a cutting edge 52 (see Fig. 23) on the carrier in severing a blank from the strip $a$. The slide 50 also carries a primary folding blade or crimper 53 formed to coöperate with opposed faces on parts supported by the carrier 31 in imparting to the blank a trough shape, preliminary to the placing of the ribbon in the trough.

Mounted in the standard 37, parallel with the slide 50 is another slide 54 which carries a secondary folding blade or punch 55 which has a grooved lower edge 56 (Figs. 5, 15 and 23) adapted and operated as hereinafter described to first bend one edge of the edges of the trough-shaped blank inwardly as shown in Fig. 24 and afterward bend the opposite edge of the blank inwardly as shown in Fig. 25, the tube which is thus completely formed having its edges slightly overlapped. The means for actuating the slides 50 and 54 will be described presently. They are reciprocated vertically in guides in the standard 37, located over the path in which the carrier 31 reciprocates horizontally, so that the knife 51, crimper 53 and punch 55 are adapted to coöperate successively with the parts of the tip-forming mechanism mounted on said carrier.

When the slide 50 first descends, the knife 51 coacts with the cutting edge 52 and cuts off a blank which is immediately pushed into the recess presently described, by the crimper 53 (Fig. 23). As the slide rises, the end of the strip springs back to horizontal position ready to be fed forward over the edge 52. One side of the channel or recess into which the blank is pushed is formed by the rear face 60 of a vertical flange 58 (Figs. 23 and 26) rising from the carrier 31, the cutting edge 52 being an angular corner of said flange. The other side of said recess is formed by the end 61 of a slide 62 (Figs. 23 and 27) which is movable horizontally on the carrier. Said channel or recess is indicated at 64 in Figs. 5 and 7. The slide 62 is normally retained in the position shown in Fig. 23 by a spring 63, one end of said spring bearing against a lug 65 rising from the carrier, and the other against a shoulder of the slide 62. It will therefore move with the carrier until its outer end contacts with an adjustable stop 66 carried by the frame of the machine. When the carrier is at the inward extreme of its movement (Fig. 23) the recess or channel is of maximum width and is positioned to receive the lower portion of the crimper 53, the cutting edge 52 being positioned to coöperate with the knife 51. The carrier remains in this position while the slide 50 descends and causes the severance of a blank from the strip and the insertion of said blank in the channel 64 by the crimper 53, the blank being given a trough-shape by the sides of the channel and said crimper. The slide 50 then rises and the carrier is moved outwardly to the position shown in Fig. 24, the channel being now under the punch 55, and the channel face 61 substantially in alinement with the outer side of said punch. While the carrier is in this position the ribbon is deposited in the bent blank by the mechanism hereinafter described. Such deposit occurs before the punch descends to the position shown in Fig. 24. When said punch descends it enters the channel at one side of the center thereof so that its grooved lower edge engages one of the lips or edges of the bent blank and rolls said lip over upon the ribbon. The slide 54 is then raised and the carrier is given a slight further outward movement, but the slide 62 has made contact with the fixed stop 66 so that the face 60 is moved toward the face 61 resulting in decreasing the width of the channel, the face 60 being now substantially in alinement with the inner side of the punch 55. The slide 54 now again descends and engages the other lip of the partially folded blank (Fig. 25) rolling it over upon the previously rolled lip and completing the formation of the tube. These operations can be effected without liability of the first-rolled lip springing up before the other lip is rolled down, because the members which operate directly on the blank are all kept warm by the heater so that the resilience of the sheet material is temporarily non-existent.

Prior to each descent of the punch 55, a small quantity of alcohol or other liquid which is a solvent or softener of the celluloid or other equivalent sheet material, is discharged upon said punch in a manner so that it will flow to and along the entire lower edge of the punch and act to soften the portions of the blank with which said edge comes in contact. Said solvent or softener is supplied through a duct 67 (Figs. 6 and 21), said duct communicating with a cup or small vertical boring 68 in the standard 37, which is intermittently charged with the liquid from a reservoir 69 by automatic means hereinafter described, the duct 67 being provided with a needle valve 70 which is opened by the ascent of the punch 55, and allows a small quantity of the liquid to flow to said punch and down to and along its lower edge. This softening of the tip material, together with the pressure exerted upon it by the punch, and the heat imparted to the faces 60, 61, as well as to the punch by the heater, insures the formation of a permanent tube which tightly embraces the inclosed and compressed ribbon fabric. Since the entire lower edge of the punch is supplied with solvent or softening material, when said punch descends the liquid, owing to its own consistency and its affinity for celluloid, spreads over the entire inner surface of the sheet material so that the heat, and the pressure of the final act of wrapping, result in the inner surface portions of the sheath or tube uniting with the fibers of the ribbon fabric with such intimacy as to hold the tip tightly on the lacing when in use, without any necessity of perforating or otherwise rendering the tube irregular. The fibers of the ribbon are to some extent embedded in the inner surface of the tube, and the overlapped edges or lips of the blank are so intimately united that the final sheath or tip is practically seamless or integral throughout, and capable of withstanding all pulling strain, and the effort of the inclosed fabric to expand from an extremely compressed and small condition.

Before describing the mechanism for severing the sheath and the inclosed ribbon, I will explain the means for actuating the slides 50 and 54. The slide 50 which carries the knife and crimper is formed with recesses in its sides (Fig. 5) to receive the forked end 71 of a lever 72 (Figs. 2 and 21) pivotally mounted on a screw or bolt 73 and having its outer end provided with a pin 74 to which a spring 75 is connected to cause said lever to follow the movements of a vertical slide 76, the outer end of the lever bearing on the top of said slide as shown in Fig. 2. The lower end of said slide is shown in Fig. 5, and has a roll 77 bearing on a cam 78 secured on shaft 34. The slide 54 is connected by a link 79 (Fig. 5) with a lever 80 pivoted at 81 (Fig. 6) in the standard 37. The pivot pin projects as shown in Figs. 1, 2 and 5, and a spring 82 is fixed at one end to said pin and at the other end bears on a pin 83 projecting from the lever 80, to cause said lever to follow the movements of a vertical slide 84 (Figs. 5 and 6) the lower end of which has a roll 85 bearing on a cam 86 secured to shaft 34. A spring 87 depresses said slide after the cam raises it.

The cam 86 is so formed as to impart two reciprocations to the slide 54 to cause the punch 55 to act twice, in quick succession, to perform the operations hereinbefore described in connection with Figs. 24 and 25, namely; to first roll or bend one lip of the blank and then roll or bend the other lip and lap it upon the first.

The strip $a$ of sheet celluloid or analogous material, is supplied from a reel 88 (Fig. 2) supported by brackets 89, and passes over the table between suitable guides 90, to the nip of the feed rolls 91 which are geared together at 92. To actuate these rolls step-by-step to advance the strip in a direction toward the right, Fig. 23, I provide the following mechanism. A ratchet 93 (Figs. 2, 4, 18 and 19) is secured to the shaft 94 of the lower feed roll. Hung on shaft 94 is a lever 95 having two pawls 96, 97, spring-pressed toward the ratchet. A link or connecting rod 98 is connected at one end to the lever 95 and at the other end to the carrier 31 (Fig. 4) so that as said carrier reciprocates for each operation, the strip $a$ is advanced one step. To vary the length of feed to control the area of the blanks severed from the strip according to the bulk of the lacing ribbon, I provide a shield 99 carried by an arm 100 which is pivoted on shaft 94, said shield having a rod or arm 101 connected to it, the other end of said arm having a slot 102 (Fig. 2) through which a binding or set screw 103 passes into the table 35. By adjusting the setting of the arm 101, more or less of the shield is interposed between the ratchet and the path of reciprocations of the pawls so that feed movements of any desired extent may be imparted to the rolls 91.

The ribbon fabric $b$ is supplied from a suitably mounted reel 104, and passes over the table 35 and under a spring-pressed tension bar 105 (Figs. 1, 2 and 6), then under the punch 55 and between folders to turn the edges of the ribbon inwardly as hereinafter described, then between a pair of feed rolls 106, then under an adjustable roller 107, then between a second pair of feed rolls 108, and then between a third pair of feed rolls 109, which latter push the ribbon and the tube that has been applied thereto, under the knife 110 carried by a bar 111, which knife completes the formation of the tipped laces. The purpose of the roller 107 is to form a loop or bight in the ribbon to provide for proper lengths of lacings without having to space the knife which cuts the tubes so far from the place where the said tubes are applied, as is necessary when the ribbon is drawn straight out from the forming mechanism to the severing mechanism, as shown in Figs. 28, 29 and 30. However, since there are some disadvantages resulting from passing the tubes in any curved paths, as will be hereinafter described, I prefer the construction illustrated in said Figs. 28, 29 and 30, since the only advantage resulting from the bight-forming roller 107 is the saving of a couple of feet or so in the length of the machine.

Before describing the construction illustrated in said Figs. 28, 29 and 30, I will refer to the mechanism which is the same in both forms of machine illustrated in the drawings, and therefore, for the present, no reference need be made to the said Figs. 28, 29 and 30. Referring to Fig. 6, the two rolls of each of the pairs 106, 108 and 109 are geared together, and all are intermittently rotated in a direction to feed the ribbon toward the left in said Fig. 6. The loop or bight-forming roller 107 is mounted on a rod 112 (Fig. 3) the ends of which pass through inclined slots 113 in the sides of the frame (see Figs. 1 and 6). Mounted on the rod 112 at each end thereof is a hub 114 which is yieldingly pressed toward the inside of the frame by a spring 115 confined between the inner end of the hub and a collar 116 secured to said rod. The hubs 114 have pins 117 projecting from their faces, said pins being adapted to enter any one of the pairs of holes 118 formed in the frame at the sides of the slots 113. When longer or shorter lacings are to be formed, the rod 112 carrying the roller 107 is adjusted along the slots 113 by grasping the hubs 114, drawing them toward each other to release their pins 117 from the holes 118, then sliding the rod and its hubs toward the desired position, after which the hubs may be released and if the pins do not then enter holes the rod may be moved a little farther in the desired direction and the pins will snap into the holes so that the roller 107 will remain in the desired position according to the length of lacings that are to be tipped. The intermittent rotation of the first two pairs of feed rolls 106, 108, is obtained by a gear 119 (Fig. 6) mounted on a shaft 120, which is intermittently actuated as hereinafter described, said gear 119 meshing with the pinions on the lower rolls of said two pairs. The rolls 109 are driven at a slightly higher surface speed than that of the rolls 106, 108, to constantly preserve a tension upon the ribbon. As will be presently described, however, the surfaces of the rolls 109 may slip upon the celluloid tube when the latter reaches the nip of this pair of rolls and is stopped by the gage in position for the operation of the knife. The rate of speed of the rolls 109 is about ten per cent. faster than that of the rolls 106, 108, the drive of said rolls 109 being effected by a train of gearing 121, 122, 123, and 124, the pinion or gear 121 being driven by the pinion of the lower roll of the pair 108, while the pinions or gears 123, 124, are compounded, the smaller one 123, meshing with the intermediate gear 122 while the larger one 124 meshes with the pinion carried by the lower roll of the pair 109. The shaft 120, besides carrying the gear 119, has another gear 125 at its outer end, as shown in Figs. 1 and 3. Said gear 125 meshes with and is driven by a pinion 126 on a stud shaft 127 which passes through an arc slot 128 in the frame of the machine and is supported by a bracket 129 that is mounted on the shaft 34 so that it can be swung on the axis of said shaft for the purpose presently described. The pinion 126 is secured to rotate with the stud shaft 127, and splined on said stud shaft is a clutch member 130 having an annular groove 131. Mounted freely on said stud shaft 127 is a pinion 132 having clutch teeth 133 so that, when said clutch teeth are engaged by the clutch member 130, the rotation of the pinion 132 will be transmitted to the stud shaft and, through pinion 126 and gear 125, to the shaft 120, and, by the gear 119 of the latter, to the several pairs of feed rolls. A larger gear 134 secured on the shaft 34 meshes with the pinion 132. Said gear 134 is constantly revolved when the machine is in operation, but when the clutch member 130 is shifted away from the clutch teeth 133, the pinion 132 will rotate idly on the stud shaft 127 and therefore there will be no motion imparted to the shaft 120 and to the ribbon-feeding rolls.

To automatically control the clutch so that the feed will be intermittent, a yoke 135 engages the annular groove 131 of the splined clutch member, the hub 136 of said yoke being slidably mounted on a pin 137 supported by the frame of the machine. Said hub 136 has a fixed lug or pin 138 which projects into the path of a face cam 139 on the side of the gear 134. To cause the yoke and its hub 136 to shift on the pin 137 so that the lug 138 will follow the cam 139 and cause the clutch 130 to be intermittently engaged with and disengaged from the clutch teeth 133, a suitable spring 140 is employed, said spring being coiled about the stud shaft 127 and confined between the outer face of the clutch member 130 and an arm of the bracket 129.

In order that different sizes of pinions 126 may be employed to obtain different lengths of feed of the ribbon-feeding rolls, the stud shaft 127, which is carried by the bracket 129, may be shifted along the arc slot 128. To secure the stud shaft and bracket 129 in adjusted position, toward or from the axis of gear 125, (Fig. 1) the bracket 139 is provided with an arm 141 (Fig. 6) through which, and the slot 128, a clamp bolt 142 passes. The gear 134 on cam shaft 34 is driven by a pinion 143 (see Figs. 3 and 6) secured to a shaft 144 which carries a larger gear 145 that is driven by a pinion 146 on a shaft 147. The latter has a pulley 148 (Fig. 1) driven by a belt 149 from a pulley 150 of a suitable electric or other motor 151. The sides of the frame of the machine are braced by suitable tie rods 152 (Figs. 1 and 3).

When the ribbon that is to be tipped is wide, it is desirable that its edges shall be turned or folded inwardly in order that the celluloid tube shall properly inclose it, and it is preferable that one edge shall always be folded in advance of the other. To accomplish this, I provide two pairs of folders 153, 154, (Figs. 5, 6, 7, 17 and 22), the ribbon passing between the two folders of each pair on its way to the feed rolls. In addition to these folders, which are rocked, I may employ stationary curved guides 155 as shown by full lines in Fig. 7, and dotted lines in Fig. 17. Each folder is mounted to oscillate on a pivot 156, and is formed with teeth 157 meshing with racks formed on vertical slide rods 158, 159. There is a rack rod 158 for each of the two folders 153, and a rack rod 159 for each of the two folders 154. Said rack rods are actuated by arms 160 of a rock shaft 161, the latter having another arm 162 which extends under an arm 163 of a rock shaft 164 (see Figs. 4 and 17). The rock shaft 164 has an arm 165 (see Figs. 4 and 5) connected by a link 166 with a slide 167 having a roll 168 bearing on a cam 169 secured to shaft 34. A spring 170 coiled on rock shaft 164 and having one end secured to a bearing for said shaft and the other end to a collar 171 secured on the shaft, actuates the said shaft in opposition to the cam 169. A spring 172 coiled on rock shaft 161 (Figs. 4 and 22) and having one end connected to said shaft and the other end to a fixed pin 173, actuates said shaft in opposition to the arm 163 of rock shaft 164. The folders 153 and 154 are shown in Fig. 17 as in their outermost position, and it will be readily understood that as the rack rods 158, 159 rise, said folders will turn inwardly the edges of any wide ribbon that has been drawn between them and over the channel 64 by the feed rolls. The timing of their operation is such as to do their folding just prior to the descent of the punch 55, and to remain in position to hold the ribbon folded during both of the forming operations of the punch. In order that the first descent of the punch will cause the folded ribbon (or an unfolded one if the fabric is narrow) to be pushed down into the trough-shaped blank which has been previously bent into the recess or channel 64 of the carrier by the crimper 53. I provide a toe or presser 174 at each end of the punch 55 (Figs. 6 and 21), the parts below said toes being provided with recesses or depressions so that the lower ends of the toes can carry the ribbon at each end of the recess or channel 64 to a plane lower than the bottom of said channel, thus pressing the ribbon in taut condition into the U-shaped blank then in said channel. To accurately guide the ribbon to the folders, and to impart a preliminary upward turn to the extreme edges of the ribbon, I may employ adjustable guides as indicated at 175 in Figs. 2, 6 and 7. After the ribbon leaves the tube-forming mechanism, it passes under a guide 176 on its way to the rolls 106.

I will now describe the means whereby the two folders 154 operate in advance of the opposite folders 153 (Fig. 17) to insure proper folding of a wide ribbon. The two rack rods 158, 159, of each pair are actuated by one arm 160 of the rock shaft (see Fig. 17) and the two arms 160 are substantially alike (see Figs. 4 and 22), being formed with slots 177 through which the flattened lower ends of the rack rods pass, thus preventing the rack rods from turning on their longitudinal axes. In Fig. 4, the slots are shown as formed in lateral projections of one arm 160 and directly in the body of the other arm 160, but this is merely due to expediency of construction and does not affect the operation. The structure shown in Fig. 17 may apply to either pair of rack rods. As shown in said figure, the rack rods are provided with pins 178 near their lower ends, the rod 158 has a shoulder 179, and the rod 159 has an upper pin 180 between which and the top of arm 160 a spring 181 is confined on the rod. A stop plate 182 (see also Fig. 4) extends under the lower end of each rack rod 158, to limit its lower position.

When the rock shaft 161 is actuated so that its two arms 160 move in the direction of the arrow in Fig. 17 to elevate the rack rods and swing the folders 153, 154, to turn the edges of the ribbon, the rods 159 are lifted first, through the medium of the springs 181, said springs being of sufficient strength to lift the rods and rock the folders 154 without materially collapsing. The rods 158 do not begin to rise until the arms 160 reach the shoulders 179, but in the meantime the rods 159 have performed, or nearly performed, their functions. After the arms 160 have reached the shoulders 179, further movement in the direction of said arrow causes the rods 158 to rise and rock the folders 153 inwardly. After the folders 154 have reached their innermost positions and the rods 159 can rise no higher, the springs 181 yield so as to permit the arms 160 to finish the actuation of the rods 158 and folders 153, thus completing the operation of uniformly folding the ribbon at the points where it is to be inclosed in the celluloid tube. It is understood of course, that during the operation of the folders, the feeding has ceased, and that as soon as the tube is applied the folders open and the feed begins and continues long enough to draw along a length of ribbon according to the length of lacing desired, when the feed again stops and the folders act on the portion of the ribbon that is to have the next tube applied thereto.

The knife 110 which cuts through the mid-length or center of the tube and the tightly inclosed ribbon, to complete the making of the tipped lacings, is carried by a bar 111 (see Fig. 20 in connection with Figs. 1, 2, 4 and 6), said bar being pivoted at 183 to a fixed bracket 184 and at the other end guided between lugs 185. The bar 111 is connected by a link 186 with an arm 187 of the rock shaft 164, the knife being therefore, actuated by the rock shaft at the same time that the folders are caused to collapse the ribbon at the proper point, relatively to the cut, for the length of lacing desired.

From the description so far given, it will be understood that I have provided a machine which applies to a length of lacing ribbon, at a point intermediate the ends thereof, a sheath or tube which is adapted to be cut, with the inclosed ribbon, to form two tipped lacing ends; and that by so doing I am able to produce lacings which have the tips very firmly secured thereto while the fabric is under some longitudinal tension, and, what is of especial importance, with the ends of the tips absolutely flush with the ends of the fibers inclosed therein, this being an advantage that could not be attained if two separate but adjacent tubes were applied and then only the fabric cut at a point between said adjacent tube ends.

I will now describe the means whereby the tubes (and the ribbon therein) may be cut at the exact center or mid-length thereof to form tipped ends of two lacings, this being a particularly important feature of my invention. because it insures the production of lacings with tips of uniform and exact lengths. A stop 188 (Figs. 1, 2, 6 and 20) is movable to and from a position that is distant from the knife 110 equal to one-half of the applied sheath or tube and consequently equal to the length of one complete tip, said stop when in position, serving to arrest the advancing end of a tube, the ribbon beyond said tube, being flexible, passing up over the top of the stop. The feeding movement of the rolls does not cease until after the tube contacts with the stop, and preferably not until just after the knife 110 has operated, in order that the rolls 109, between which the rear end of the tube remains when its front end reaches the stop, may frictionally act on the tube to hold it against the stop while the knife operates. At this time the rolls 109 slip on the smooth surface of the sheet celluloid; but as the upper roll is mounted in spring-pressed bearings, the necessary friction is obtained without damage to the celluloid. Suitable means may be provided for varying the distance between the knife and the stop for tips of different lengths, as by substituting for the knife bar 111 another one having the knife blade 110 differently positioned.

Preferably the stop 188 is carried by the front end of a lever 189 pivotally mounted on the shaft 120 (Figs. 3 and 6) and having a roll 190 contacting with a cam 191 on shaft 34, a spring 192 actuating said lever in opposition to the cam. To prevent the tube from slipping laterally and being pushed past the stop, suitable side guides 193 (Figs. 2, 6 and 20) may be employed and to prevent the tube from being pushed over the top of said stop, a top guiding bar 194 may be used, the tip and lacing passing under said bar. With such a bar in place, it is desirable that the stop 188 shall be lowered temporarily after the cutting of the tube in two, so that the cut off lacing may drop away into any suitable receptacle and, in doing so, draw its rear tip out from under the bar 194.

To intermittently supply the small receptacle 68 (Fig. 21) with solvent, a pipe 195 leads from the reservoir 69 to said receptacle, the pipe having a cock 196 provided with an arm 197 projecting into the path of movement of the pin 74 carried by the lever 72 (see Fig. 2), so that as the lever oscillates, the cock is intermittently opened to permit small quantities of solvent to pass. The arm 197 is drawn against a stop screw 198 by a spring 199, to close said cock.

Whether the machine produces straight tips or tapered tips, depends simply upon the shapes of the cutting and forming members. If the tubes are to be formed as indicated in Fig. 13, from blanks having the shapes indicated in Fig. 11, the knife will have the form indicated at 51ª in Fig. 9. To coöperate with one side of such knife, the table will be formed with an angular recessed edge 35ª, and to coöperate with the other side of such knife 51ª, the flange 58 will be formed with an angular recessed edge 58ª (Fig. 8). Then the faces of the members which provide the channel into which the blank is depressed by the crimper will be shaped as indicated in Fig. 8, said channel being indicated at 64ª, and the punch will be formed as indicated at 55ª in the bottom edge view shown in Fig. 15. To facilitate changes, in the shapes of the blanks cut off, the flange 58 may be constructed separate from the carrier, as indicated in Fig. 26, and attached to the carrier by any suitable means, so that one shape of flange may be substituted for another.

To prevent liability of the carrier 31 being thrown by its actuating mechanism, out of accurate position for the first operation of the punch and so as to render it certain that for such operation the carrier will occupy the position shown in Fig. 23, a suitable stop is provided, such as the rod 200 shown in Figs. 3 and 5, said stop rod having a threaded portion engaging a hole in the side of the frame, and having a jam nut 201 to lock it in properly adjusted position.

In Figs. 28, 29 and 30, I show means whereby the ribbon and the tubes or sheaths successively applied thereto, are drawn straight out from the applying and forming mechanism instead of passing down under a bight-forming roll. The reason why it is preferable to construct the machine with the parts as shown in said Figs. 28, 29 and 30 is that when the celluloid tubes or sheaths pass from rolls 106, under roll 107, and then up and between rolls 108, they are still in a somewhat soft condition and liable to become bent or curved in their several changes of direction of movement and therefore are liable to not meet the knife and centering stop properly, or to issue from the machine in straight condition. In the three figures referred to, the machine is shown as having a frame extension 202 which is provided with an opening 203 at the sides of which are ways 204 from an adjustable table 205 which may be held in the desired position longitudinally of said ways, by set screws 206.

The ribbon and its applied tubes passes directly from feed rolls 106 to feed rolls 108 (or one pair of these rolls might be omitted) and from them directly and in a straight line to a pair of rolls 207 mounted in bearings supported by the adjustable table 205. The rolls 207 are geared together at 208, and the lower gear is driven by a pinion or gear 211 on a shaft 209 supported by brackets 210 depending from the table 205 (Fig. 30). Said shaft has a sprocket wheel 212 connected by a chain 213 (Figs. 28 and 29) with a sprocket wheel on an intermediate shaft 214, the latter having another sprocket wheel connected by a chain 215 with a sprocket wheel carried by a shaft 216 mounted in brackets 217 depending from the table portion 35 of the frame of the machine. The shaft 216 carries a pinion 218 driven by the gear of the lower feed roll 108. The intermediate shaft 214 is carried at the intersection of two links 219, 220, which, at their outer ends, are pivotally supported respectively on the shafts 209, 216. The links keep taut the driving chains which carry the power to the rolls 207, regardless of the position of adjustment of the table 205 which, of course, is according to the length of lacings being tipped.

The adjustable table carries the knife and centering stop, and I will next describe how the latter are actuated in any position of adjustment of the said table. Keyed on the cam shaft 34 is a bevel pinion 221 which meshes with a bevel pinion 222 on a shaft 223 mounted in suitable bearings in the frame extension 202, said shaft having a long key-way or groove 224 (Fig. 29). A cam 225 is mounted on said shaft, said cam being slidable along said shaft, with the table 205, and having a key entering the key-way 224. To control the position of this cam (and another one presently described), it is embraced by a yoke 226 carried by an arm 227 of table 205. A slide 228 having a roll 229 bearing on cam 225 is mounted in a bearing 230 carried by a web 231 of the table 205. The upper end of the slide is connected by a link 232 with a lever 233 pivoted to the under side of the table 205 at 234, the other end of the lever extending up to form a stop 235 in the path of the tube passing between rolls 207. Side guides 236 and a top guide 237 are provided, for the same purpose as those previously described in connection with Fig. 2.

The knife bar 111, having a knife 110, is pivoted at 183 to brackets 184 and at the other end is movable between lugs 185, the structure being substantially the same as the parts having the same numerals in Fig. 20. In Fig. 30, however, the knife bar is connected by a link 238 with one end of a lever 239 pivoted at 240 to a bracket 241 depending from the adjustable table 205. The other end of said lever is pivotally connected at 242 to the upper end of a slide 243 mounted in a bearing or slideway 244 and having a roll 245 at its lower end bearing on a cam 246 carried by shaft 223. A spring 247 actuates said slide in opposition to the cam. The cam 246, with the cam 225, is embraced by the yoke 226, so that both cams are shifted along their carrying shaft 223 when the table 205 is adjusted. To guide the ribbon to the rolls 207, I provide light strips of metal 248 having their outer ends formed with slots 249 through which binding screws 250 pass, into the table 205. The inner ends of said strips are bent to form uprights which present side guides 251 for the ribbon, and a plate attached to one of the strips and bridging the tops of the guides 251, forms a top guide 252 for the ribbon.

With either structure illustrated and described for providing for varying the lengths of the lacings, that is, whether the adjustable table 205 is utilized or the adjustable bight-forming roll 107 of Figs. 1 and 6 is employed, when such changes are made, the pinion 126 (Fig. 1) will be replaced by one of a different size, as hereinbefore described. As indicated in Fig. 5, the knife 51, crimper 53, and punch 55, are all removably connected with the slides 50, 54;

for renewal, or the substitution of others for different shapes of tip tubes to be cut off and applied. The feed rolls 106, 108 and 109, or at least, the upper rolls of the several pairs, are preferably grooved, as at 253, in Fig. 2, to avoid excessive pressure on the tubes. And the peripheral portions of said rolls are preferably of yielding material, such as rubber or felt. The grooves 253 are, of course, in line with substantially the centers of the spaces between the side guides 193.

While I have referred to the tips as having externally smooth surfaces, I do not limit myself thereto, as the sheet material may have any desired surface configuration. For instance, if it be desired that the tip shall have the appearance of fabric, the surface which is exposed may be subjected to the action of dies which will give the configuration preferred, and such results may be produced upon the celluloid either before it is cut into blanks and converted into tips by the machine, or the acting surfaces of the tip-forming members might be so formed as to impart the desired surface configuration to the tips by the same pressure that converts the blanks into tubular form.

I do not claim herein either broadly or specifically, those portions of the machine which are illustrated chiefly in Figs. 23, 24 and 25 of the drawings, or the means for applying a solvent and heating the celluloid, as the same are claimed in my application 632,736 filed June 12, 1911; nor do I claim herein any of the features which are common to both of the machines shown in the two applications.

I claim:—

1. A machine for tipping laces, having means for feeding the ribbon, means for applying tubes to said ribbon at predetermined intervals, means for severing the tubes and the ribbon inclosed therein at the mid-length of the tubes, and means for coöperating with one end of the tube for determining the accuracy of the location of the cut.

2. A machine for tipping laces, having means for feeding the ribbon, means for applying tubes to said ribbon at predetermined intervals, a knife for severing the tubes and the ribbon inclosed therein, a stop, and means for holding each tube with one end against the stop in position for the knife to operate at the mid-length of the tube.

3. A machine for tipping laces, having means for feeding the ribbon, means for applying tubes to said ribbon at predetermined intervals, a knife for severing the tubes and the ribbon inclosed therein, a stop, and means for holding each tube with one end against the stop in position for the knife to operate at the mid-length of the tube, said holding means comprising a pair of rolls between which the ribbon and applied tubes are fed, said rolls being adapted to slip on a tube while the latter is arrested by the stop.

4. In a machine of the character described, a stop, means for applying tubes to a ribbon, feed devices for pushing the product of the machine toward the stop, and a knife between said feed devices and stop for severing said product, said means for applying the tubes being located in position to perform the applying before a tube reaches said feed devices.

5. A machine of the character described, comprising means for applying a tube to a ribbon, a stop, feed devices for pushing the tube endwise to the stop, and a knife to sever the tube while arrested by the stop.

6. A machine for applying tip tubes to a length of lacing ribbon, including tip forming mechanism and folders for collapsing or folding the ribbon prior to inclosing it in the tube and independently of the formation of the tubes.

7. A machine for applying tip tubes to a length of lacing ribbon, including means for bending a blank of tipping material to a substantially U-form, means for collapsing or folding the ribbon, and means for pushing the folded ribbon into the bent blank and then closing the said blank around the ribbon.

8. A machine for applying tip tubes to a length of lacing ribbon, including means for bending a blank of tipping material to a substantially U-form, means for collapsing or folding the ribbon, and a punch for closing the blank around the ribbon, said punch having pushers for inserting the ribbon into the bent blank.

9. A machine of the character described, comprising means for bending a blank of sheet material to a substantially U-form, guides for directing a ribbon longitudinally adjacent the bent blank, means for laterally deflecting the ribbon into the partially bent blank, and means for then closing the blank around the ribbon.

10. A machine of the character described, comprising means for bending a blank of sheet material to a substantially U-form, guides for directing a ribbon longitudinally adjacent the bent blank, means for laterally deflecting the ribbon into the partially bent blank, means for then closing the blank around the ribbon, and means for severing the closed blank and the ribbon at the mid-length of said closed blank.

11. A machine of the character described, comprising a single set of tube formers, means for intermittently feeding a strip of tube material thereto, and means for intermittently feeding a ribbon between the said formers to have tubes successively applied thereto.

12. A machine of the character described, comprising a single set of tube formers, means for intermittently feeding a strip of tube material thereto, means for intermittently feeding a ribbon between the said formers to have tubes successively applied thereto, and means for cutting said tubes at their mid-lengths.

13. A machine of the character described, comprising a single set of tube formers, means for intermittently feeding a strip of tube material thereto, means for intermittently feeding a ribbon between the said formers to have tubes successively applied thereto, a stop in the path of endwise movement of the tubes, and a cutter for severing each tube and its inclosed ribbon while the tube is arrested by the stop.

14. A machine of the character described, comprising means for intermittently feeding a ribbon, means for holding the ribbon under tension as it is fed, means for feeding a strip of tipping material transverse of the path of the ribbon, means for severing blanks from the strip and wrapping them around the ribbon to form tube sheaths at intervals on the ribbon, and means for severing the tubes and inclosed ribbon at the mid-length of said tubes.

15. A machine of the character described, comprising a plurality of pairs of intermittently actuated ribbon-feed rolls, the rolls of one pair having a higher surface speed than the other rolls to hold the ribbon under tension, means for applying tubes to said ribbon at spaced intervals, and means for cutting each tube and the inclosed ribbon.

16. A machine of the character described, comprising a plurality of pairs of intermittently actuated ribbon-feed rolls, the rolls of one pair having a higher surface speed than the other rolls to hold the ribbon under tension, means for applying tubes to said ribbon at spaced intervals, a stop beyond the higher speed rolls, and a cutter mounted to operate on the tube and inclosed ribbon at a point between said stop and higher speed rolls.

17. A machine of the character described, comprising ribbon-feed mechanism, means for applying tubes successively to the ribbon, a clutch included in the ribbon-feed mechanism, and means for automatically shifting the clutch to interrupt the operation of the feed during the application of each tube to the ribbon.

18. A machine of the character described, comprising ribbon-feed mechanism, means for applying tubes successively to the ribbon, a clutch included in the ribbon-feed mechanism, means for automatically shifting the clutch to interrupt the operation of the feed during the application of each tube to the ribbon, and means for varying the timing of the shifting of the clutch to obtain different lengths of feed of the ribbon between the interruptions.

19. A machine of the character described, comprising ribbon-feed mechanism, means for applying tubes successively to the ribbon, and means for folding edge portions of the ribbon before the application of the tubes thereto.

20. A machine of the character described, comprising ribbon-feed mechanism, means for applying tubes successively to the ribbon, and means for folding first one edge of the ribbon and then the opposite edge before the application of each tube thereto.

21. A machine of the character described, comprising ribbon-feed mechanism, means for applying tubes successively to the ribbon, and rocking folders for turning edge portions of the ribbon inwardly before the application of each tube thereto.

22. A machine of the character described, comprising ribbon-feed mechanism, means for applying tubes successively to the ribbon, means for transversely curving the ribbon on its way to the tube-applying mechanism, and rocking folders for turning edge portions of the ribbon inwardly before the application of each tube thereto.

23. A machine of the character described, comprising ribbon-feed mechanism, means for applying tubes successively to the ribbon, rocking folders for turning edge portions of the ribbon inwardly, and means for actuating the rockers on one side in advance of the actuation of those on the other side.

24. A machine of the character described, comprising ribbon-feed mechanism, means for applying tubes successively to the ribbon, pivoted folders on opposite sides of the path of the ribbon, said folders having toothed segments, racks engaging said segments, and means for reciprocating said racks.

25. A machine of the character described, comprising ribbon-feed mechanism, means for applying tubes successively to the ribbon, pivoted folders on opposite sides of the path of the ribbon, said folders having toothed segments, racks engaging said segments, and means for reciprocating the racks on one side in advance of the reciprocations of those on the other side.

26. A machine of the character described, comprising ribbon-feed mechanism, means for applying tubes successively thereto, a stop movable to and from position to arrest the applied tubes, a knife adjacent said stop, and means for operating the knife while the stop is in arresting position.

27. A machine of the character described, comprising ribbon-feed mechanism, means for applying tubes successively thereto, a table adjustable in distance from the tube-applying mechanism, and severing devices carried by said adjustable table.

28. A machine of the character described, comprising ribbon-feed mechanism, means for applying tubes successively thereto, a table adjustable in distance from the tube-applying mechanism, a stop carried by said table, and severing devices to act on each tube when arrested by said stop.

29. A machine of the character described, comprising ribbon-feed mechanism, means for applying tubes successively thereto, a table adjustable in distance from the tube-applying mechanism, a stop carried by said table, feed devices also carried by said table to push each tip against said stop, and a knife between said feed devices and stop.

30. A machine of the character described, comprising ribbon-feed mechanism, means for applying tubes successively thereto, a table adjustable in distance from the tube-applying mechanism, a rotary shaft, cams slidingly mounted on said shaft and connected thereto to be rotated thereby, a movable stop and a knife carried by said table, connections for operating the stop and knife by said cams, and means whereby said cams are shifted along the shaft in unison with adjustment of the table.

In testimony whereof I have affixed my signature, in presence of two witnesses.

ERNEST A. GALLISON.

Witnesses:
A. W. HARRISON,
J. M. MURPHY.